(12) United States Patent
Tatsuta et al.

(10) Patent No.: US 10,738,885 B2
(45) Date of Patent: Aug. 11, 2020

(54) ACTUATOR APPARATUS

(71) Applicant: Nidec Tosok Corporation, Zama-shi, Kanagawa (JP)

(72) Inventors: Hiroshi Tatsuta, Zama (JP); Kazumi Shinkai, Zama (JP); Shun Kato, Zama (JP); Shuichi Kinjo, Zama (JP); Kohei Osuga, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 268 days.

(21) Appl. No.: 15/869,114

(22) Filed: Jan. 12, 2018

(65) Prior Publication Data

US 2018/0202547 A1 Jul. 19, 2018

(30) Foreign Application Priority Data

Jan. 13, 2017 (JP) .................. 2017-004202

(51) Int. Cl.
*F16H 61/32* (2006.01)
*F16H 61/02* (2006.01)
*F16H 61/00* (2006.01)
*F16H 63/50* (2006.01)
*F16H 63/34* (2006.01)
*H02K 5/06* (2006.01)

(52) U.S. Cl.
CPC ......... *F16H 61/32* (2013.01); *F16H 61/0031* (2013.01); *F16H 61/0297* (2013.01); *F16H 63/3416* (2013.01); *F16H 63/502* (2013.01); *F16H 63/3425* (2013.01); *F16H 63/3466* (2013.01); *F16H 63/3475* (2013.01); *F16H 63/3483* (2013.01); *H02K 5/06* (2013.01)

(58) Field of Classification Search
CPC .. F16H 61/32; F16H 61/0031; F16H 61/0297; F16H 63/3416; F16H 63/3425; F16H 63/3466; F16H 63/3475; F16H 63/3483
See application file for complete search history.

(56) References Cited

U.S. PATENT DOCUMENTS

| 2003/0019702 A1* | 1/2003 | Goedecke ............... B60T 1/005 188/353 |
| 2009/0058208 A1 | 3/2009 | Kimura et al. |
| 2012/0234124 A1* | 9/2012 | Nozaki .................. F16H 61/32 74/473.12 |
| 2014/0190784 A1 | 7/2014 | Yokota et al. |

FOREIGN PATENT DOCUMENTS

| JP | 2009-065742 A | 3/2009 |
| JP | 2014-134243 A | 7/2014 |

* cited by examiner

*Primary Examiner* — Huan Le
(74) *Attorney, Agent, or Firm* — Keating & Bennett

(57) ABSTRACT

An actuator apparatus includes an oil passage body including an oil passage therein, an electric actuator, a movable unit moved at least in a first direction and a second direction by the electric actuator, and an auxiliary device including an actuating member moved by hydraulic pressure of oil in the oil passage. When the electric actuator moves the movable unit in the second direction, the auxiliary device applies, through the actuating member to the movable unit, a force pointing in a direction that moves the movable unit in the second direction.

9 Claims, 5 Drawing Sheets

ACTUATOR APPARATUS

CROSS REFERENCE TO RELATED APPLICATIONS

This application claims the benefit of priority to Japanese Patent Application No. 2017-004202 filed on Jan. 13, 2017. The entire contents of this application are hereby incorporated herein by reference.

BACKGROUND OF THE INVENTION

1. Field of the Invention

The present invention relates to an actuator apparatus.

2. Description of the Related Art

Actuators are known, which are used in a system that includes an oil passage body, mounted on an automatic transmission that changes the speed of an engine output for running a vehicle, and include an electric motor.

Such an actuator is described, for example, in Japanese Unexamined Patent Application Publication No. 2009-65742.

When an actuator such as that described above requires a large output, the size of the electric motor may be increased to increase the output of the actuator. However, this increases the overall size of the actuator and increases the space required for mounting the actuator. Note that the phrase "when an actuator such as that described above requires a large output" refers to the case where, for example, when the actuator is one that is configured to switch a park switching mechanism mounted on an automatic transmission, the actuator switches the park switching mechanism from a locked state to an unlocked state.

SUMMARY OF THE INVENTION

An object of the present invention is to provide an actuator apparatus having a structure that improves the output while suppressing a size increase.

An actuator apparatus according to an aspect of the present invention includes an oil passage body including an oil passage therein, an electric actuator, a movable unit moved at least in a first direction and a second direction by the electric actuator, and an auxiliary device including an actuating member moved by hydraulic pressure of oil in the oil passage. When the electric actuator moves the movable unit in the second direction, the auxiliary device applies, through the actuating member to the movable unit, a force pointing in a direction that moves the movable unit in the second direction.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

In the XYZ-axis coordinate system shown in each drawing, the Z-axis direction is a vertical direction, whereas the X-axis direction and the Y-axis direction are horizontal directions orthogonal to the Z-axis direction and orthogonal to each other. In the following description, a direction parallel to the Z-axis direction is referred to as "vertical direction Z", a direction parallel to the X-axis direction is referred to as "front-rear direction X", and a direction parallel to the Y-axis direction is referred to as "right-left direction Y". In the vertical direction Z, a positive side (+Z side) in the Z-axis direction is an upper side, and a negative side (−Z side) in the Z-axis direction is a lower side. In the front-rear direction X, a positive side (+X side) in the X-axis direction is a front side, and a negative side (−X side) in the X-axis direction is a rear side. In the right-left direction Y, a positive side (+Y side) in the Y-axis direction is a left side, and a negative side (−Y side) in the Y-axis direction is a right side.

Note that the upper side (upward), lower side (downward), front side (forward), rear side (rearward), left side (leftward), right side (rightward), vertical direction, front-rear direction, and right-left direction are merely terms used to describe relative positional relationships between elements. Actual positional relationships between the elements may differ from those indicated by the terms described above.

Figure 1:
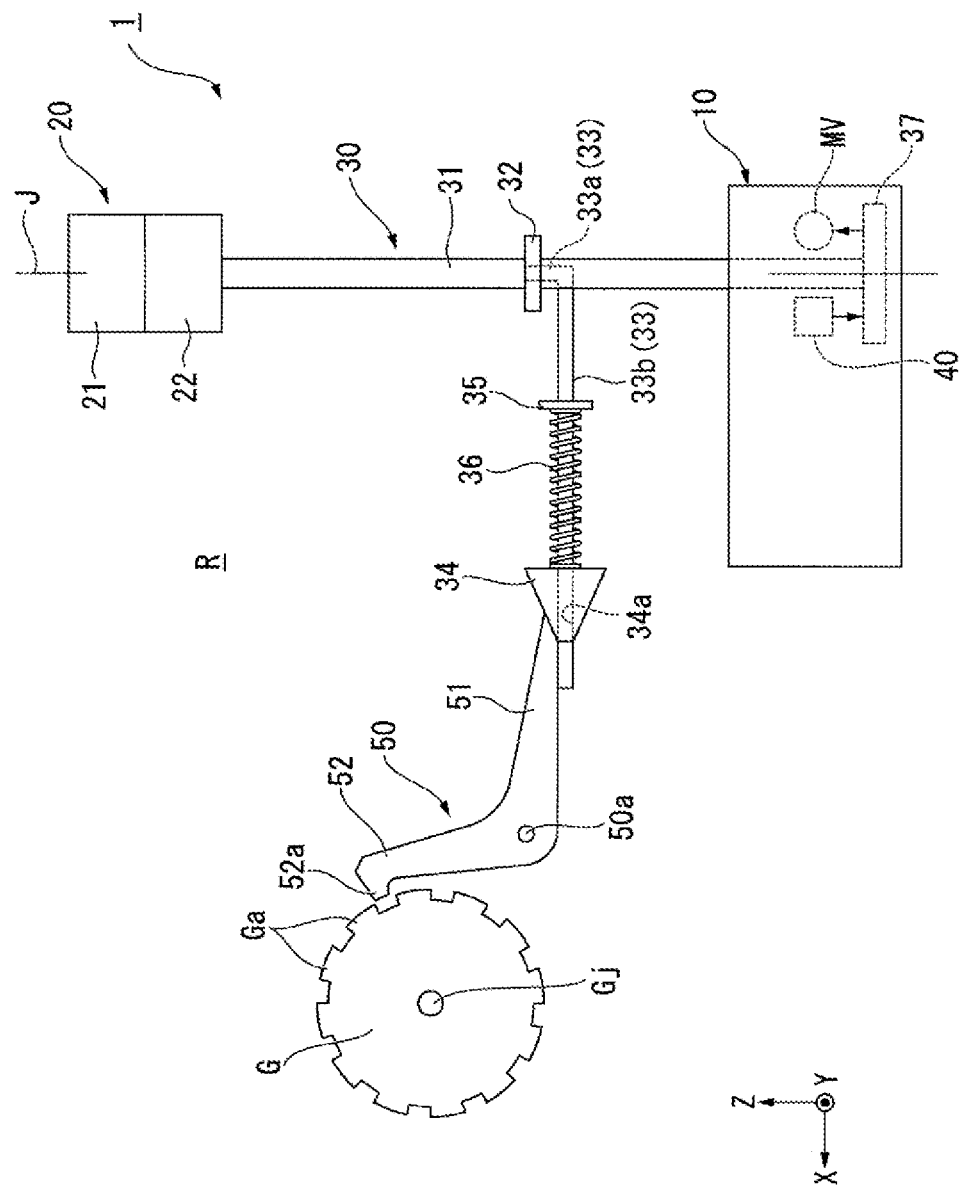
FIG. 1 illustrates an actuator apparatus of an embodiment as seen from a left side.
Figure 2:
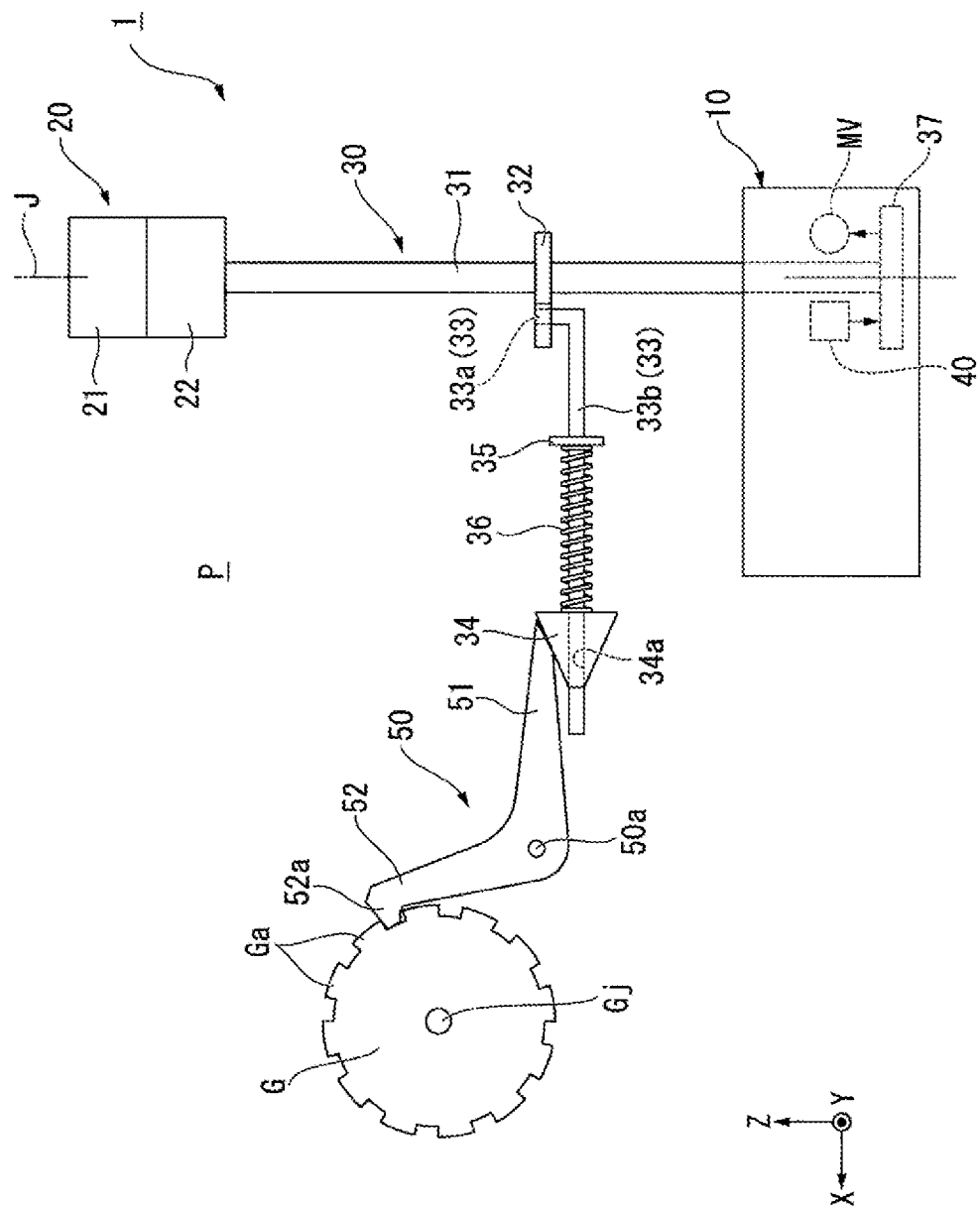
FIG. 2 also illustrates the actuator apparatus of the embodiment as seen from the left side.

An actuator apparatus 1 according to an embodiment illustrated in FIGS. 1 and 2 is a shift-by-wire actuator apparatus mounted on a vehicle and driven in accordance with a driver's shift operation. The actuator apparatus 1 moves a manual valve MV in accordance with the driver's shift operation and switches an oil hydraulic circuit in an oil passage body 10. The actuator apparatus 1 thus shifts vehicle's gears, for example, between Park, Reverse, Neutral, and Drive.

The actuator apparatus 1 switches a park lock gear G between a locked state and an unlocked state in accordance with a driver's shift operation. When the vehicle's gears are in Park, the actuator apparatus 1 brings the park lock gear G into the locked state, whereas when the vehicle's gears are in a position other than Park, the actuator apparatus 1 brings the park lock gear G into the unlocked state. The park lock gear G is a gear coupled to an axle. The park lock gear G has a plurality of teeth Ga on the outer periphery thereof, and rotates about a rotation shaft Gj extending in the right-left direction Y.

Figure 3:
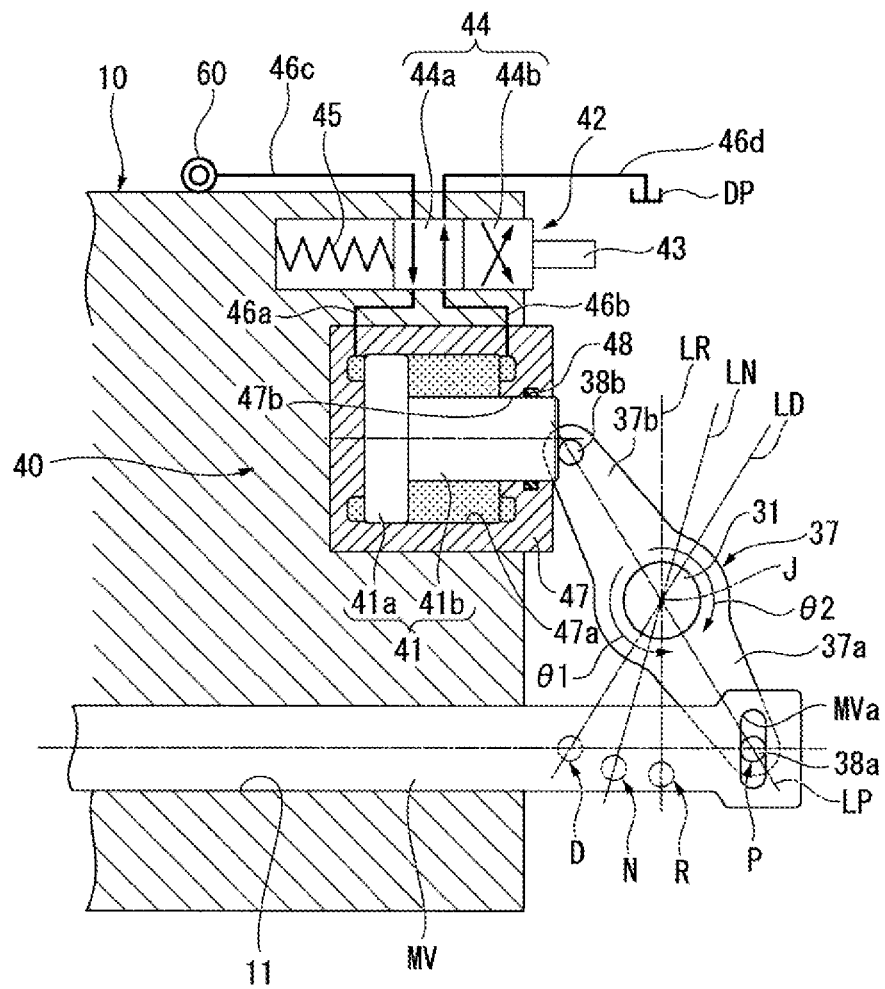
FIG. 3 is a cross-sectional view of part of the actuator apparatus of the embodiment as seen from an upper side.
Figure 4:
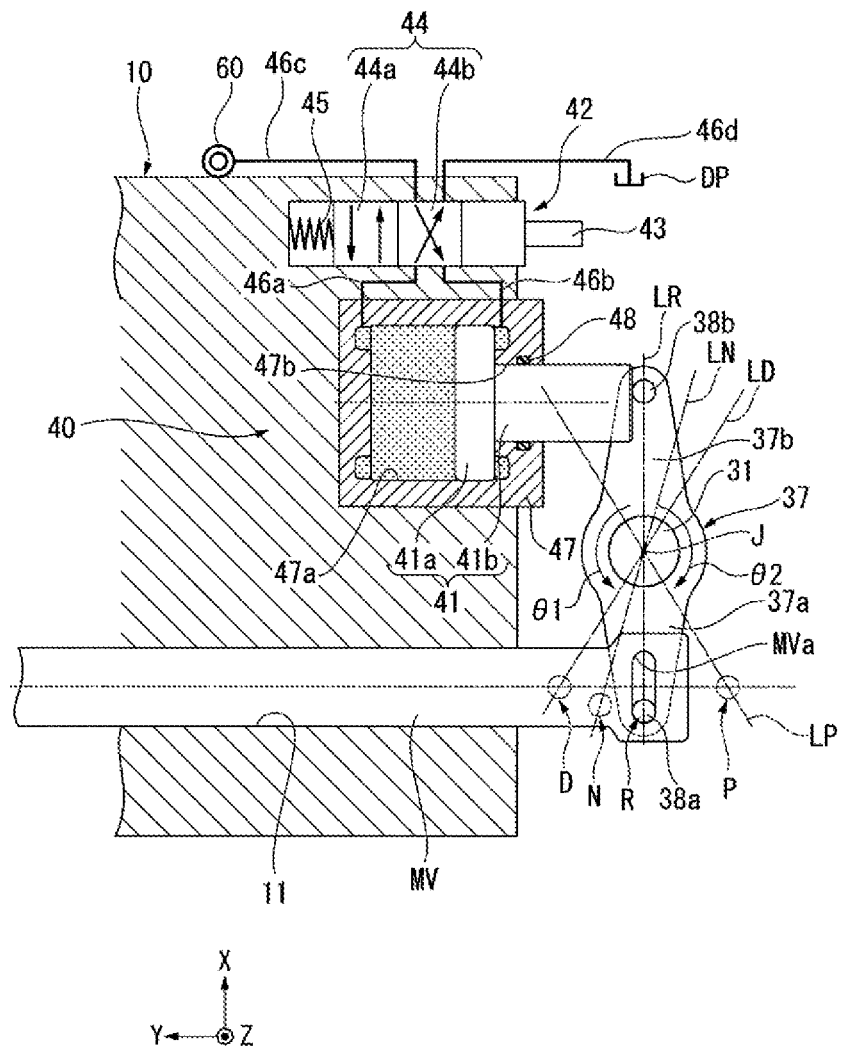
FIG. 4 is also a cross-sectional view of the part of the actuator apparatus of the embodiment as seen from the upper side.

The actuator apparatus 1 includes the oil passage body including oil passages therein, an electric actuator 20, a movable unit 30, a park lock arm 50, and an auxiliary device 40. The oil passage body 10 includes the oil hydraulic circuit formed by a plurality of oil passages. As illustrated in FIGS. 3 and 4, the oil passage body 10 includes an insertion cavity 11 recessed in the right-left direction Y. The insertion cavity 11 is connected to the oil passages in the oil passage body 10. The manual valve MV is disposed in the insertion cavity 11 in such a manner as to be movable in the right-left direction Y. The manual valve MV is thus mounted in the oil passage body 10. The manual valve MV is a rod-like member extending in the right-left direction Y. When the manual valve MV moves in the right-left direction Y, connections between the oil passages in the oil passage body 10 are changed and the oil hydraulic circuit is switched.

As illustrated in FIG. 1, the electric actuator 20 includes a motor 21 and a speed reducer 22. The motor 21 includes an output shaft centered about a central axis J extending in the vertical direction (axial direction) Z. The speed reducer 22 is connected to the output shaft of the motor 21. The speed reducer transmits the power of the motor 21 to a manual shaft 31 (described below) of the movable unit 30 at a reduced speed. The electric actuator 20 thus rotates the manual shaft 31 about the central axis J. When a vehicle's driver performs a shift operation, a current corresponding to the movement of a shift lever operated by the driver is supplied to the motor 21, which drives the electric actuator 20. In the following description, a radial direction centered on the central axis J is simply referred to as "radial direction".

The movable unit 30 includes the manual shaft 31, a coupling portion 32, a rod 33, a support portion 34, a flange portion 35, a coil spring 36, and an arm portion 37. The manual shaft 31 is a cylindrical member extending in the vertical direction Z. The manual shaft 31 is disposed along the central axis J.

Figure 5:
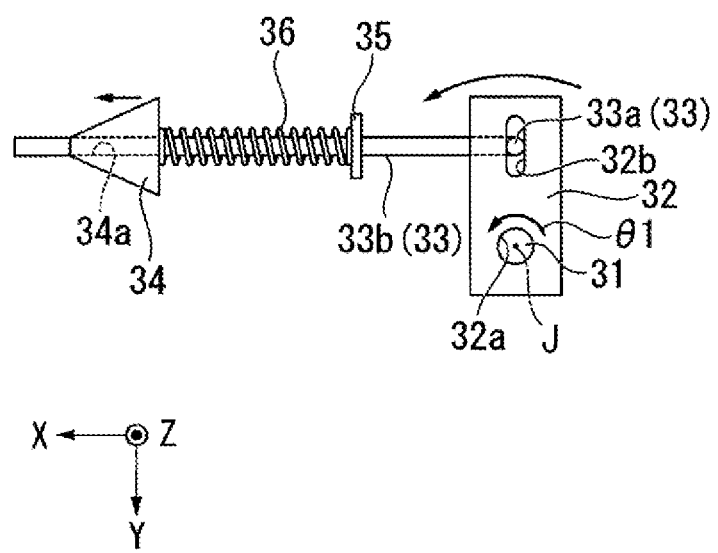
FIG. 5 illustrates another part of the actuator apparatus of the embodiment as seen from the upper side.

The coupling portion 32 is secured to the manual shaft 31. As illustrated in FIG. 5, the coupling portion 32 is a rectangular plate-like member extending in one direction. The coupling portion 32 has, at one end thereof, a securing hole 32a that passes therethrough in the vertical direction Z. The manual shaft 31 is passed through the securing hole 32a and secured in place. The coupling portion 32 is thus secured at the one end thereof to the manual shaft 31. The coupling portion 32 extends outward from the manual shaft 31 in the radial direction.

The coupling portion 32 has, at the other end thereof (an outer end thereof in the radial direction), a first coupling hole 32b that passes therethrough in the vertical direction Z. The first coupling hole 32b is a rounded rectangular hole elongated in the one direction (the right-left direction Y in FIG. 5) in which the coupling portion 32 extends.

The rod 33 is disposed in such a manner as to be movable along the front-rear direction X. The rod 33 includes a connecting portion 33a and a rod body 33b. As illustrated in FIGS. 1 and 2, the connecting portion 33a is a rod-like member extending in the vertical direction Z. As illustrated in FIG. 5, an upper end of the connecting portion 33a is inserted in the first coupling hole 32b. The upper end of the connecting portion 33a is movable within the first coupling hole 32b along the direction in which the first coupling hole 32b extends. While not shown, a retainer (e.g., nut) in contact with the upper surface of the coupling portion 32 is attached to the upper end of the connecting portion 33a. This prevents the connecting portion 33a from coming out of the first coupling hole 32b. As illustrated in FIGS. 1 and 2, the rod body 33b is a rod-like member extending forward from a lower end of the connecting portion 33a.

The support portion 34 is a truncated conical member centered about an axis extending along the front-rear direction X. The outside diameter of the support portion 34 increases from the front side to the rear side. The support portion 34 has a through hole 34a that passes therethrough in the front-rear direction X. A front extremity of the rod body 33b is passed through the through hole 34a. The support portion 34 is movable with respect to the rod body 33b in the front-rear direction X. For example, the support portion 34 and the rod body 33b are concentrically disposed.

The flange portion 35 is secured to the rod body 33b on the rear side of the support portion 34. The coil spring 36 extends in the front-rear direction X. The coil spring 36 is disposed between the support portion 34 and the flange portion 35 in the front-rear direction X. The rod body 33b is passed through the inside of the coil spring 36. The coil spring 36 is secured at a rear end thereof to the flange portion 35, and is secured at a front end thereof to the support portion 34. The coil spring 36 expands and contracts as the support portion 34 moves relative to the rod body 33b in the front-rear direction X, and applies an elastic force in the front-rear direction X to the support portion 34.

The arm portion 37 is secured to a lower end of the manual shaft 31. As illustrated in FIG. 3, the arm portion 37 includes a first arm 37a and a second arm 37b that extend outward from the manual shaft 31 in the radial direction. That is, the movable unit 30 includes the first arm 37a and the second arm 37b. The first arm 37a and the second arm 37b extend in directions opposite each other. As seen from the upper side, the first arm 37a and the second arm 37b are reduced in width outward in the radial direction.

The first arm 37a has a first protrusion 38a that protrudes upward. The first protrusion 38a is disposed at an outer end of the first arm 37a in the radial direction. The first protrusion 38a is inserted from the lower side into a second coupling hole MVa that passes through a right end portion of the manual valve MV in the vertical direction Z. The second coupling hole MVa is a rounded rectangular hole elongated in the front-rear direction X. The first protrusion 38a is movable relative to the second coupling hole MVa in the front-rear direction X. The first arm 37a is coupled to the manual valve MV, with the first protrusion 38a therebetween. The second arm 37b has a second protrusion 38b protruding upward. The second protrusion 38b is disposed at an outer end of the second arm 37b in the radial direction. The second protrusion 38b is disposed in such a manner that it can contact a piston member 41 (described below).

The movable unit 30 is driven by the electric actuator 20. Specifically, the manual shaft 31 is rotated about the central axis J by the electric actuator 20. In the following description, the direction of counterclockwise rotation about the central axis J as seen from the upper side is referred to as "first rotation direction θ1", and the direction of clockwise rotation about the central axis J as seen from the upper side is referred to as "second rotation direction θ2". The coupling portion 32 and the arm portion 37 also rotate about the central axis J as the manual shaft 31 rotates. That is, the first arm 37a and the second arm 37b rotate about the central axis J as the manual shaft 31 rotates.

As illustrated in FIG. 5, the rod 33 moves in the front-rear direction X as the coupling portion 32 rotates about the central axis J. The rod 33 moves forward as the coupling portion 32 rotates in the first rotation direction θ1. The rod 33 moves rearward as the coupling portion 32 rotates in the second rotation direction θ2. The support portion 34, the flange portion 35, and the coil spring 36 move in the front-rear direction X as the rod 33 moves in the front-rear direction X.

The first rotation direction θ1 and the direction of forward movement correspond to a first direction, and the second rotation direction θ2 and the direction of rearward movement correspond to a second direction. That is, the movable unit 30 is moved at least in the first direction and the second direction by the electric actuator 20. In the present specification, the phrase "the movable unit moves" means that the three-dimensional position of at least part of the movable unit changes; that is, the movable unit may move either linearly or in a curved manner, or may swing or rotate.

The electric actuator 20 switches the position of the movable unit 30 at least between a park position P and any one of non-park positions in accordance with a driver's shift operation. The non-park positions are positions other than the park position P. In the present embodiment, as illustrated in FIGS. 3 and 4, the non-park positions include a drive position D, a neutral position N, and a reverse position R. That is, in the present embodiment, the electric actuator 20 switches the position of the movable unit 30 between the drive position D, neutral position N, reverse position R, and park position P in accordance with a driver's shift operation.

The drive position D is the position of the movable unit 30 when the vehicle's gears are in Drive, the neutral position N is the position of the movable unit 30 when the vehicle's gears are in Neutral, the reverse position R is the position of the movable unit 30 when the vehicle's gears are in Reverse, and the park position P is the position of the movable unit 30 when the vehicle's gears are in Park. For example, FIGS. 1 and 4 illustrate the movable unit 30 in the reverse position R (non-park position), and FIGS. 2 and 3 illustrate the movable unit 30 in the park position P.

In the park position P, as illustrated in FIG. 3, the first arm 37a and the second arm 37b are positioned along an imaginary line LP inclined from the front-rear direction X in the first rotation direction θ1, as seen from the upper side. In the reverse position R, as illustrated in FIG. 4, the first arm 37a and the second arm 37b are positioned along an imaginary line LR extending in the front-rear direction X as seen from the upper side. In the neutral position N, the first arm 37a and the second arm 37b are positioned along an imaginary line LN inclined from the front-rear direction X in the second rotation direction θ2, as seen from the upper side. In the drive position D, the first arm 37a and the second arm 37b are positioned along an imaginary line LD inclined more from the front-rear direction X in the second rotation direction θ2 than the imaginary line LN is, as seen from the upper side.

The position of the first protrusion 38a in the right-left direction Y changes from the park position P to the reverse position R, to the neutral position N, and then to the drive position D in this order from right to left. As the position of the first protrusion 38a in the right-left direction Y changes, the position of the manual valve MV to which the first protrusion 38a is coupled changes in the right-left direction Y. That is, the position of the manual valve MV in the right-left direction Y changes from the park position P to the reverse position R, to the neutral position N, and then to the drive position D in this order from right to left. The first arm 37a thus moves the manual valve MV. The position of the second protrusion 38b in the right-left direction Y changes from the park position P to the reverse position R, to the neutral position N, and then to the drive position D in this order from left to right.

As illustrated in FIG. 1, the park lock arm 50 is disposed forward of the movable unit 30. The park lock arm 50 is disposed in such a manner as to be rotatable about a rotation shaft 50a, which extends in the right-left direction Y. The park lock arm 50 includes a first portion 51 and a second portion 52. The first portion 51 extends rearward from the rotation shaft 50a. The first portion 51 is in contact, at a rear end thereof, with the outer periphery of the support portion 34. The second portion 52 extends upward from the rotation shaft 50a while being slightly inclined forward. The second portion 52 has, at an upper end thereof, an engaging portion 52a protruding forward.

The park lock arm 50 moves as the movable unit 30 moves. Specifically, the park lock arm 50 rotates about the rotation shaft 50a as the rod 33 and the support portion 34 move in the front-rear direction X. When the manual shaft 31 rotates in the first rotation direction θ1 from the reverse position R illustrated in FIG. 1, the coupling portion 32 rotates in the first rotation direction θ1 and causes the rod 33 and the support portion 34 to move forward. As described above, the outside diameter of the support portion 34 increases from the front side to the rear side. Therefore, when the support portion 34 moves forward, the first portion 51 in contact with the support portion 34 is moved upward and the park lock arm 50 rotates counterclockwise about the rotation shaft 50a, as seen from the left side. This brings the engaging portion 52a close to the park lock gear G, and allows the engaging portion 52a to be engaged between adjacent ones of the teeth Ga as illustrated in FIG. 2. That is, the park lock arm 50 engages with the park lock gear G coupled to the axle in the park position P.

Depending on the position of the teeth Ga, the engaging portion 52a may contact any of the teeth Ga; that is, the park lock arm 50 may fail to rotate to a position which allows the engaging portion 52a to be engaged between adjacent ones of the teeth Ga, and may be unable to move to the park position P. In the present embodiment, however, the support portion 34 is movable with respect to the rod 33 in the front-rear direction X. Therefore, while moving to the park position P, the rod 33 allows the support portion 34 to be located rearward of the park position P. This reduces interference with the rotation of the manual shaft 31, and suppresses a load applied to the electric actuator 20.

When the rod 33 is located in the park position P and the support portion 34 is located rearward of the park position P, the coil spring 36 is in a compressed and deformed state. This means that a forward elastic force is applied to the support portion 34 by the coil spring 36. Thus, through the support portion 34, a rotation moment pointing in a direction that causes counterclockwise rotation about the rotation shaft 50a, as seen from the left side, is applied from the coil spring 36 to the park lock arm 50. Therefore, when the park lock gear G rotates to change the position of the teeth Ga, the park lock arm 50 rotates to allow the engaging portion 52a to be engaged between adjacent ones of the teeth Ga.

When the manual shaft 31 rotates in the second rotation direction θ2 from the park position P illustrated in FIG. 2, the coupling portion 32 rotates in the second rotation direction θ2 and causes the rod 33 and the support portion 34 to move rearward. When the support portion 34 moves rearward, the first portion 51 raised by the support portion 34 is moved downward by its own weight or by a force applied thereto from the park lock gear G. This allows the park lock arm 50 to rotate clockwise about the rotation shaft 50a as seen from the left side. Thus, the engaging portion 52a is separated from the park lock gear G and disengaged from the teeth Ga as illustrated in FIG. 1. That is, the park lock arm 50 is disengaged from the park lock gear G in a non-park position (the reverse position R in FIG. 1).

For example, the park lock arm 50 may be provided with an elastic member that applies, in the park position P, a rotation moment pointing in a direction that causes clockwise rotation about the rotation shaft 50a, as seen from the left side. In this case, when the support portion 34 moves rearward, an elastic force of the elastic member causes the park lock arm 50 to rotate clockwise about the rotation shaft 50a, as seen from the left side. The elastic force applied by the elastic member to the park lock arm is small enough to prevent the coil spring 36 from being compressed and deformed even when a rearward force is applied, in the park position P, from the elastic member through the first portion 51 to the support portion 34. This suppresses rearward movement of the support portion 34 with respect to the rod 33 in the park position P, and suppresses rotation of the park lock arm 50. It is thus possible to prevent disengagement of the park lock arm 50 from the park lock gear G.

As illustrated in FIGS. 3 and 4, the auxiliary device 40 is included in the oil passage body 10. The auxiliary device 40 includes a cylinder 47, the piston member 41 serving as an actuating member, an electromagnetic valve 42, and an electric oil pump 60. The cylinder 47 is embedded in and secured to the oil passage body 10. The cylinder 47 includes therein a cylinder chamber 47a, which is filled with oil.

The piston member 41 includes a piston body 41a and a shaft portion 41b. The piston body 41a is disposed in the cylinder chamber 47a and divides the cylinder chamber 47a internally into rooms in the right-left direction Y. The shaft portion 41b extends rightward from the piston body 41a. A right end of the shaft portion 41b passes through a through hole 47b in the cylinder 47 and protrudes to the outside of the oil passage body 10. The right end of the shaft portion 41b can contact the second protrusion 38b. The through hole 47b and the shaft portion 41b are provided with a sealing member 48 therebetween. This reduces leakage of oil from the cylinder chamber 47a to the outside.

A left-side oil passage 46a is connected to the room on the left side of the cylinder chamber 47a divided by the piston body 41a, and a right-side oil passage 46b is connected to the room on the right side of the cylinder chamber 47a divided by the piston body 41a. The left-side oil passage 46a and the right-side oil passage 46b are oil passages provided in the oil passage body 10. The left-side oil passage 46a and the right-side oil passage 46b are connected through the electromagnetic valve 42 to either a supply oil passage 46c connected to the electric oil pump 60 or a discharge oil passage 46d connected to a drain port DP.

In the following description, the room on the left side of the cylinder chamber 47a divided by the piston body 41a is referred to as "left-side cylinder chamber", and the room on the right side of the cylinder chamber 47a divided by the piston body 41a is referred to as "right-side cylinder chamber".

The electromagnetic valve 42 includes a spool casing 44, an elastic member 45, and a solenoid 43. The spool casing 44 includes oil passages therein and is mounted in the oil passage body 10. The spool casing 44 is a columnar member extending in the right-left direction Y. In a cavity in the oil passage body 10, the spool casing 44 is disposed in such a manner as to be movable in the right-left direction Y. The spool casing 44 includes a first oil passage portion 44a and a second oil passage portion 44b.

The first oil passage portion 44a and the second oil passage portion 44b are arranged side by side in the right-left direction Y. The first oil passage portion 44a is disposed to the left side of the second oil passage portion 44b. As illustrated in FIG. 3, the first oil passage portion 44a includes an oil passage that can connect the left-side oil passage 46a to the supply oil passage 46c, and another oil passage that can connect the right-side oil passage 46b to the discharge oil passage 46d. As illustrated in FIG. 4, the second oil passage portion 44b includes an oil passage that can connect the left-side oil passage 46a to the discharge oil passage 46d, and another oil passage that can connect the right-side oil passage 46b to the supply oil passage 46c.

In the cavity of the oil passage body 10 in which the spool casing 44 is inserted, the elastic member 45 is disposed to the left side of the spool casing 44. The elastic member 45 applies a rightward elastic force to the spool casing 44.

The solenoid 43 moves the spool casing 44 in the right-left direction Y. For example, when a current is passed through the solenoid 43 in a given direction, a magnetic force that moves the spool casing 44 leftward increases, and the spool casing 44 is moved leftward against the elastic force of the elastic member 45. On the other hand, when a current is passed through the solenoid 43 in a direction opposite that described above, a magnetic force that moves the spool casing 44 leftward decreases, and the spool casing 44 is moved rightward by the elastic force of the elastic member 45.

When the spool casing 44 is moved in the right-left direction Y by the solenoid 43, the connections of the left-side oil passage 46a, the right-side oil passage 46b, the supply oil passage 46c, and the discharge oil passage 46d change. When the first oil passage portion 44a is in the position illustrated in FIG. 3, the electric oil pump 60 is connected to the left-side cylinder chamber, and the drain port DP is connected to the right-side cylinder chamber. Thus, oil is supplied into the left-side cylinder chamber and hydraulic pressure in the left-side cylinder chamber is raised, whereas oil in the right-side cylinder chamber is discharged therefrom and hydraulic pressure in the right-side cylinder chamber is lowered. The hydraulic pressure thus moves the piston member 41 rightward.

When the second oil passage portion 44b is in the position illustrated in FIG. 4, the electric oil pump 60 is connected to the right-side cylinder chamber, and the drain port DP is connected to the left-side cylinder chamber. Thus, oil is supplied into the right-side cylinder chamber and hydraulic pressure in the right-side cylinder chamber is raised, whereas oil in the left-side cylinder chamber is discharged therefrom and hydraulic pressure in the left-side cylinder chamber is lowered. The hydraulic pressure thus moves the piston member 41 leftward.

As described above, the electromagnetic valve 42 switches the flow of oil supplied to the piston member 41. In accordance with the oil flow switched, the piston member 41 receives hydraulic pressure of oil supplied by the electric oil pump 60, and is moved by the hydraulic pressure. The direction of movement of the piston member 41 is thus switched by the electromagnetic valve 42.

When the electric actuator 20 moves the movable unit 30 in the second rotation direction θ2, the auxiliary device 40 applies, through the piston member 41 to the movable unit 30, a force pointing in a direction that moves the movable unit 30 in the second rotation direction θ2. Therefore, for example, even when a large output is required to move the movable unit 30 in the second rotation direction θ2, an output produced by combining the output of the electric actuator 20 with the output of the auxiliary device 40 can move the movable unit 30 in the second rotation direction θ2. Thus, without increasing the size of the electric actuator 20, the movable unit 30 can be moved in the second rotation direction θ2. The piston member 41, which serves as an actuating member for the auxiliary device 40, is moved by hydraulic pressure of oil in an oil passage included in the oil passage body 10. Therefore, even though being smaller in size than the electric actuator 20, the auxiliary device 40 is capable of producing a larger output. Thus, even with the auxiliary device 40, it is easier to reduce the overall size of the actuator apparatus 1 than in the case where the electric actuator 20 is increased in size to supplement the output of the auxiliary device 40. The present embodiment thus provides the actuator apparatus 1 having a structure that improves the output while suppressing a size increase.

Since the auxiliary device 40 uses the oil passages included in the oil passage body 10, the trouble and cost of mounting the auxiliary device 40 can be reduced when the actuator apparatus 1 is applied to a system including the oil passage body 10. Since the existing oil passage body 10 can be partly used, it is easier to reduce the size of the auxiliary device 40 and suppress an increase in the size of the actuator apparatus 1.

In the present embodiment, the phrase "when a large output is required to move the movable unit 30 in the second rotation direction θ2" refers to the case when the movable unit 30 is moved from the park position P to the reverse position R. In the park position P, the park lock arm 50 engages with the park lock gear G to stop the rotation of the park lock gear G coupled to the axle. Therefore, a large load is applied to the park lock arm 50 and the first portion 51 is pressed hard against the support portion 34. This means that a large force is required to move the support portion 34 rearward and to move the movable unit 30 from the park position P to the reverse position R.

In the present embodiment, when the electric actuator 20 moves the movable unit 30 from the park position P to a non-park position (the reverse position R in the present embodiment), the auxiliary device 40 applies a force to the movable unit 30. Therefore, even when the electric actuator 20 is reduced in size to reduce the overall size of the actuator apparatus 1, it is possible to move the movable unit 30 in the second rotation direction θ2 and move the movable unit 30 from the park position P to the reverse position R.

Specifically, in the park position P illustrated in FIG. 3, the first oil passage portion 44a raises hydraulic pressure in the left-side cylinder chamber to move the piston member 41 rightward as illustrated in FIG. 4. When the piston member 41 is moved rightward, the right end of the shaft portion 41b contacts the second protrusion 38b and presses the second protrusion 38b rightward. This causes a rotation moment that moves the second arm 37b in the second rotation direction θ2 to be applied to the movable unit 30. The movable unit 30 thus receives a force from the auxiliary device 40 when the second arm 37b contacts the piston member 41 and receives a force therefrom.

The auxiliary device 40 is driven in accordance with a driver's shift operation. Specifically, when the driver shifts the vehicle's gears from Park to Reverse, a current is supplied to the solenoid 43 and the spool casing 44 is moved from the state of FIG. 4 to the state of FIG. 3. The piston member 41 thus starts to move rightward, and applies a force to the movable unit 30. Since the driver has shifted the vehicle's gears from Park to Reverse, a current is also supplied to the electric actuator 20 and a force is applied to the movable unit 30 in a direction that moves the movable unit 30 in the second rotation direction θ2. The electric actuator 20 and the auxiliary device 40 are thus driven in conjunction with each other in accordance with the driver's shift operation, and move the movable unit 30.

After the movable unit 30 is moved to the reverse position R, a current is supplied to the solenoid 43 in a direction that brings the spool casing 44 into the state illustrated in FIG. 4. This causes the piston member 41 to move leftward and return to the position illustrated in FIG. 3. Thus, in the present embodiment, when the movable unit 30 is in a non-park position, the auxiliary device 40 keeps the piston member 41 in the leftmost position illustrated in FIG. 3. Thus, when the movable unit 30 moves from the reverse position R to the park position P, the piston member 41 is less likely to interfere with the movement of the movable unit 30.

When the electric actuator 20 moves the movable unit 30 from a non-park position (reverse position R) to the park position P, the auxiliary device 40 does not apply a force to the movable unit 30 in the present embodiment. This simplifies the configuration and control of the auxiliary device 40. Also, when the electric actuator 20 moves the movable unit 30 between non-park positions, the auxiliary device 40 does not apply a force to the movable unit 30 in the present embodiment. That is, in the present embodiment, the auxiliary device 40 applies a force to the movable unit 30 only when the electric actuator 20 moves the movable unit 30 from the park position P to the reverse position R. This further simplifies the configuration and control of the auxiliary device 40. The phrase "when the electric actuator 20 moves the movable unit 30 between non-park positions" refers to the case when, for example, the movable unit 30 is switched between the reverse position R, the neutral position N, and the drive position D.

When the movable unit 30 is moved from a non-park position to the park position P and when the movable unit 30 is moved between non-park positions, a force required to move the movable unit 30 is relatively small. Therefore, even when the auxiliary device 40 does not apply a force to the movable unit 30, the movable unit 30 can be moved only by the electric actuator 20 which is relatively small in size.

In the present embodiment, an actuating member for the auxiliary device 40 is the piston member 41, which can be moved easily using hydraulic pressure. The piston member 41 can be stably moved in the right-left direction Y, and this allows the auxiliary device 40 to stably apply a force to the movable unit 30.

In the present embodiment, the piston member 41 receives hydraulic pressure of oil supplied by the electric oil pump 60. This means that by controlling the electric oil pump 60, a force applied to the piston member 41 can be easily regulated; that is, a force applied by the auxiliary device 40 to the movable unit 30 can be easily regulated.

In the present embodiment, the electromagnetic valve 42 is capable of switching the direction of movement of the piston member 41. This allows the auxiliary device 40 using hydraulic pressure to easily operate in conjunction with the electric actuator 20, and simplifies the control of the auxiliary device 40. The auxiliary device 40 can thus suitably apply a force to the movable unit 30 at an appropriate time.

In the present embodiment, the electromagnetic valve 42 includes the spool casing 44 including oil passages therein, and the solenoid 43 configured to move the spool casing 44. Therefore, moving the spool casing 44 can easily change the flow of oil supplied to the piston member 41. This facilitates movement of the piston member 41.

In the present embodiment, the electric actuator 20 causes the manual shaft 31 to rotate about the central axis J. Then, as the manual shaft 31 rotates, the manual valve MV moves. Therefore, for example, as compared to the case where an electric actuator uses a linearly moving member or a swinging member to move the manual valve MV, it is easier to reduce the space required for moving the movable unit 30.

In the present embodiment, the movable unit 30 includes the first arm 37a and the second arm 37b that extend outward from the manual shaft 31 in the radial direction. Therefore, while the first arm 37a is moving the manual valve MV, the movable unit 30 can receive a force from the piston member 41 of the auxiliary device 40 through the second arm 37b. Since the second arm 37b receives the force of the piston member 41 at the outer end thereof in the radial direction, a long moment arm of the rotation moment applied from the piston member 41 to the movable unit 30 is achieved. This allows a large force to be applied from the auxiliary device 40 to the movable unit 30.

The present invention is not limited to the embodiments described above, and may adopt other configurations. When the electric actuator 20 moves the movable unit 30 from a non-park position (reverse position R) to the park position P, the auxiliary device 40 may apply a force to the movable unit 30. When the electric actuator 20 moves the movable unit 30 from one non-park position to another, the auxiliary device 40 may apply a force to the movable unit 30. The non-park positions may include other positions besides the reverse position R, the neutral position N, and the drive position D.

The configuration of the auxiliary device 40 is not particularly limited, as long as a force pointing in a direction that moves the movable unit 30 in the second direction is applied to the movable unit 30, through an actuating member moved by hydraulic pressure of oil in an oil passage in the oil passage body 10. The first direction and the second direction in which the movable unit 30 moves may each be either a direction in which the movable unit 30 moves linearly, or a direction in which the movable unit 30 swings. The movable unit 30 may move in three or more directions.

Applications of the actuator apparatus according to the present invention are not limited, and the actuator apparatus of the present invention may be mounted on any type of system. When mounted on a vehicle, the actuator apparatus of the present invention may be used for purposes other than the vehicle's gear shift which is made in accordance with a shift operation.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An actuator apparatus comprising:
an oil passage body including an oil passage therein;
an electric actuator;
a movable unit moved at least in a first direction and a second direction by the electric actuator; and
an auxiliary device including an actuating member moved by hydraulic pressure of oil in the oil passage,
wherein when the electric actuator moves the movable unit in the second direction, the auxiliary device applies, through the actuating member to the movable unit, a force pointing in a direction that moves the movable unit in the second direction.

2. The actuator apparatus according to claim 1, wherein the actuator apparatus is mounted on a vehicle and driven in accordance with a shift operation,
the actuator apparatus further comprising a park lock arm configured to move as the movable unit moves,
wherein the electric actuator switches a position of the movable unit at least between a park position and a non-park position in accordance with the shift operation;
the park lock arm engages with a park lock gear coupled to an axle in the park position, and disengages from the park lock gear in the non-park position; and
when the electric actuator moves the movable unit from the park position to the non-park position, the auxiliary device applies a force to the movable unit.

3. The actuator apparatus according to claim 2, wherein when the electric actuator moves the movable unit from the non-park position to the park position, the auxiliary device does not apply a force to the movable unit.

4. The actuator apparatus according to claim 2, wherein the actuating member is a piston member moved by hydraulic pressure.

5. The actuator apparatus according to claim 4, wherein the piston member receives hydraulic pressure of oil supplied by an electric oil pump.

6. The actuator apparatus according to claim 4, wherein the auxiliary device includes an electromagnetic valve configured to switch a flow of oil supplied to the piston member; and
a direction of movement of the piston member is switched by the electromagnetic valve.

7. The actuator apparatus according to claim 6, wherein the auxiliary device is included in the oil passage body; and the electromagnetic valve includes
a spool casing including an oil passage therein and mounted in the oil passage body, and
a solenoid configured to move the spool casing.

8. The actuator apparatus according to claim 4, wherein the movable unit includes a manual shaft disposed along a central axis that extends in an axial direction;
the manual shaft is rotated about the central axis by the electric actuator; and
a manual valve mounted in the oil passage body moves as the manual shaft rotates.

9. The actuator apparatus according to claim 8, wherein the movable unit includes a first arm and a second arm that extend outward from the manual shaft in a radial direction;
the first arm and the second arm rotate about the central axis together with the manual shaft;
the first arm is coupled to the manual valve and moves the manual valve; and
the movable unit receives the force from the auxiliary device when the second arm contacts the piston member and receives a force therefrom.

* * * * *